United States Patent [19]
Hisada et al.

[11] Patent Number: 5,537,231
[45] Date of Patent: Jul. 16, 1996

[54] IMAGE TRANSMISSION APPARATUS

[75] Inventors: Katsutoshi Hisada, Tokyo; Yoshihisa Tadokoro, Kawasaki, both of Japan

[73] Assignee: Canon Kabushiki Kaisha, Tokyo, Japan

[21] Appl. No.: 936,528

[22] Filed: Aug. 28, 1992

[30] Foreign Application Priority Data

Aug. 30, 1991 [JP] Japan ................................. 3-220677
Aug. 30, 1991 [JP] Japan ................................. 3-220683

[51] Int. Cl.$^6$ .......................... H04N 1/64; H04N 1/327; H04N 1/333
[52] U.S. Cl. ........................ 358/530; 358/539; 358/435; 358/261.1
[58] Field of Search ..................... 358/434, 438, 358/500, 504, 539, 518, 530, 435, 436, 439, 468, 261.1

[56] References Cited

U.S. PATENT DOCUMENTS

| | | | |
|---|---|---|---|
| 4,682,215 | 5/1985 | Adachi | 358/539 |
| 4,739,397 | 4/1988 | Hayashi | 358/530 |
| 4,799,110 | 1/1989 | Hisada et al. | |
| 4,862,254 | 8/1989 | Takada | 358/434 |
| 4,939,767 | 7/1990 | Saito | 379/434 |
| 5,027,221 | 10/1990 | Hisatake | 358/500 |
| 5,130,818 | 7/1992 | Tadokoro et al. | |
| 5,220,417 | 6/1993 | Sugiura | 358/434 |
| 5,349,450 | 9/1994 | Yoshioka | 358/500 |

FOREIGN PATENT DOCUMENTS

| | | |
|---|---|---|
| 0364264 | 10/1988 | European Pat. Off. ......... H04N 1/32 |
| 4001755 | 8/1990 | Germany. |
| 4034540 | 5/1991 | Germany. |

OTHER PUBLICATIONS

C'T Magazin Fur Computer Technik, No. 5, May 1991, pp. 208–214, Glass, "Ein Blick in PC-gestutze und Stand–alone Faxgerate".

*Primary Examiner*—Scott A. Rogers
*Attorney, Agent, or Firm*—Fitzpatrick, Cella, Harper & Scinto

[57] ABSTRACT

An image transmission apparatus includes a color codec section for performing color image coding of a color image, a run-length codec section for performing run-length coding of a monochrome image, and a switching unit for arbitrarily switching the codec sections and to perform coding in units of pages in one communication cycle depending on whether each page is a color image or a monochrome image. Whether each page is constituted by a color image or a monochrome image is set in advance, and corresponding information is stored in a memory. Coding is performed by a coding scheme set for each page, and the coded data is transmitted. Alternatively, coded data obtained by both the codec sections and are stored in a hard disk, and the data coded by a coding scheme which an apparatus at the other end of a communication line can handle is read out and transmitted.

18 Claims, 13 Drawing Sheets

| SHEET SIZE | 3BIT |
| --- | --- |
| COMPRESSION SCHEME | 3BIT |
| COLOR/ MONOCHROME | 2BIT |

IMAGE TRANSMISSION APPARATUS

BACKGROUND OF THE INVENTION

The present invention relates to an image transmission apparatus and, more particularly, to an image transmission apparatus which can select one of coding schemes suitable for color image data and monochrome image data in units of pages depending on whether a transmission page is constituted by color image data or monochrome image data, when, for example, data having both color and monochrome document data is to be transmitted.

In a conventional apparatus of this type, document data having both color and monochrome document data is transmitted as follows. All the document data is considered either color document data or monochrome document data. The document data is then coded by a color image coding scheme suitable for color document data or a run-length coding scheme suitable for monochrome document data so as to be transmitted depending on whether the document data is considered as color or monochrome document data.

Alternatively, in order to transmit color document data and monochrome document data by different coding schemes, document data is transmitted in two communication cycles.

In other cases, for example, when it is found that an apparatus at the receiving end does not have a color document coding function, after transmission of the document data as color document data is started, the data coded by the monochrome image run-length coding scheme is transmitted again.

The above-described conventional apparatus, however, has the following problems.

(1) If monochrome document data is coded by the color image coding scheme, the following problems are posed when the data is decoded and printed out:

Since a black image is printed in three colors, i.e., red, green, and blue, a high cost is inevitable.

An unnecessary color is output on a white portion.

When a character or the like it printed, color blurring occurs at an edge portion of the character.

(2) If color document data is coded by the monochrome image run-length coding scheme, the color document data can only be transmitted as a monochrome image.

(3) If color and monochrome document data are to be separately transmitted, even though the data can be transmitted in one communication cycle, it requires cumbersome operations, i.e., sorting documents and performing transmission processing twice. In addition, transmission itself involves some cost.

(4) It is only after image communication is actually performed upon line connection that an operator can check which coding scheme an apparatus at the receiving end can handle. Therefore, unless the type of coding scheme which the apparatus at the receiving end can handle is checked in advance, the coding function of the apparatus at the receiving end may differ from the coding scheme used at the transmitting end. As a result, communication and coding processing must be performed again, and hence data transmission cannot be smoothly performed.

SUMMARY OF THE INVENTION

The present invention has been made to solve the above-described problems, and has as its object to provide an image transmission apparatus which can code even transmission document data having both color document data and monochrome document data by using coding schemes suitable for the respective types of data, and can transmit the document data in one communication cycle.

In order to achieve the above object, an image transmission apparatus according to the present invention comprises color image coding means, monochrome image run-length coding means, and switching means for switching the coding means to perform coding in units of pages in one communication cycle depending on whether each page is constituted by a color image or a monochrome image.

The switching means switches the coding means by using mode setting values "0" and "1" so that a color image and a monochrome image are switched in accordance with "0" or "1." set for each page.

The apparatus further comprises storage means for storing coded data obtained by each of the coding means at least until communication of each page data is ended, and the switching means selects coded data obtained by an arbitrary coding scheme in units of pages by selectively outputting coded data obtained by one of the coding means and stored in the storage means.

In addition, an image transmission apparatus according to the present invention comprises color image coding means, monochrome image run-length coding means, and selection means for discriminating whether a coding scheme which an apparatus at the other end of a communication line can handle is a run-length coding scheme or a color image coding scheme, and selecting one of the coding means which the apparatus at the other end of the line can handle, wherein coded data which the apparatus at the other end of the line can handle is used for communication. The apparatus further comprises switching means for arbitrarily switching the coding means suitable for coding in units of pages in one communication cycle so as to perform coding depending on whether each page is constituted by a color image or a monochrome image, if the apparatus at the other end of the line can handle both the coding schemes.

According to the above-described arrangement, even transmission document data including both color and monochrome document data can be coded by coding schemes suitable for the respective types of data, and the coded data can be transmitted in one communication cycle.

Further, in order to solve the aforementioned object, a color facsimile apparatus according to the present invention discriminates which of color document data or monochrome document data a facsimile apparatus at the other end of a communication line can handle and performs communication of the data, comprising discrimination means for discriminating whether document data which the facsimile at the receiving end of the communication line can handle is color or monochrome and communication control means for controlling to continue the communication in accordance with discrimination result by the discrimination means.

Preferably, the discrimination means discriminates which of color document data or monochrome document data which can be handled by the facsimile at the other end of the communication line using a non-standard function command (NSC) which is a parameter of a session start command (CSS) and a session start positive response (RSSP) in a session layer.

Further preferably, the communication control means terminates the communication if the discrimination means discriminates that the facsimile at the other end of the communication line can handle monochrome document data.

Preferably, the communication control means controls to convert a color image into a monochrome image to send it if the discrimination means discriminates that the facsimile at the other end of the communication line handles monochrome document data and an user performs a predetermined operation.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

An embodiment of the present invention will be described in detail below with reference to the accompanying drawings.

Figure 1:
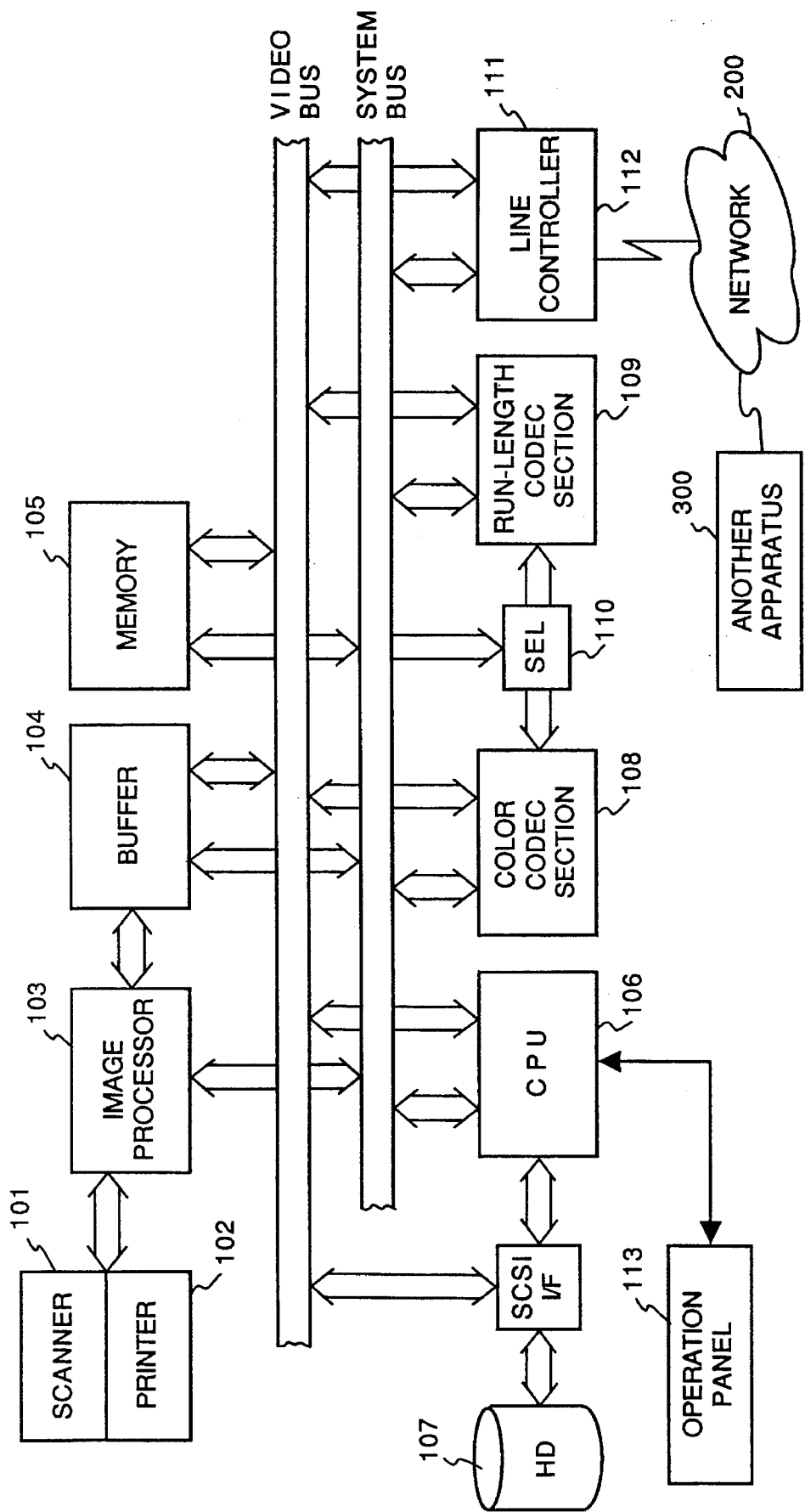
FIG. 1 is a block diagram showing an image transmission apparatus according to an embodiment of the present invention.

FIG. 1 is a block diagram showing the arrangement of an image transmission apparatus according to an embodiment of the present invention.

Referring to FIG. 1, reference numeral 101 denotes a scanner for reading a document image to be transmitted; 102, a printer for printing out an image; 103, an image processor for performing monochrome conversion and the like; 104, a buffer for temporarily storing image data which has undergone image processing; 105, a memory for storing user data, operation panel information, and the like; 106, a CPU for performing overall control of the apparatus of the embodiment in accordance with the control procedures shown in FIGS. 2 to 5(to be described later); and 107, a hard disk.

Reference numeral 108 denotes a color codec section for performing color image coding for color images; 109, a run-length codec section for performing run-length coding for monochrome images; and 110, a switching unit (SEL) for switching the color image coding scheme and the monochrome image coding scheme in accordance with read document data.

Reference numeral 111 denotes a line controller for transmission and reception; 112, a communication line such as a public line or a leased line; 113, an operation panel for receiving an input operation of an operator; 200, a network to which the communication line 112 is connected; and 300, another apparatus connected to the network 200.

Communication control of the embodiment having the above arrangement will be described below with reference to the flow charts shown in FIGS. 2A, 2B, 5A and 5B.

The following description is based on the assumption that one of the following two modes is set as an image storage pattern by a user soft switch, and the apparatus operates in accordance with the set mode.

(1) SINGLE mode

It is assumed that an apparatus on the other end of a communication line has the same arrangement as that of the apparatus of the embodiment, and both the apparatuses employ the same coding scheme. That is, assuming that the apparatus on the other end of the line can transmit/receive color document data in the same manner as the apparatus of the embodiment, image data coded by the color image coding scheme or the monochrome run-length coding scheme are stored upon mode setting performed in units of pages.

(2) AUTO mode

Image data coded by both the color image coding scheme and the monochrome image run-length coding scheme are stored so that the image data can be transmitted regardless of whether the apparatus on the other end of the line employs only the color image coding scheme or the monochrome image run-length coding scheme. In the meantime, the apparatus of the embodiment waits for a mode setting value indicating whether the color image coding scheme or the monochrome image run-length coding scheme is to be performed for data transmission in units of pages.

In addition, in (2) AUTO mode, the apparatus on the other end of the line may not have the same coding schemes as those of the apparatus of the embodiment. Assume, therefore, that for such a case, the user soft switch is used to set in advance whether communication is to be performed by using a coding scheme which can be accepted by the apparatus on the other end of the line, i.e., "what to do if the apparatus on the other end of the line cannot handle the color image coding scheme, although color image data is to be transmitted" and "what to do if the apparatus at the other end of the line cannot handle the monochrome image run-length coding scheme, although transmission is to be performed by the monochrome image run-length coding scheme".

Modes set by the user soft switch include, for example: a mode of transmitting the data of all pages according to the monochrome image run-length coding; a mode of transmitting the data of all pages according to the color image coding scheme; and a mode of terminating transmission.

Transmission of data of several pages including both color and monochrome document data (a book document in this case) will be described below on the above-described assumptions.

Figure 2A:
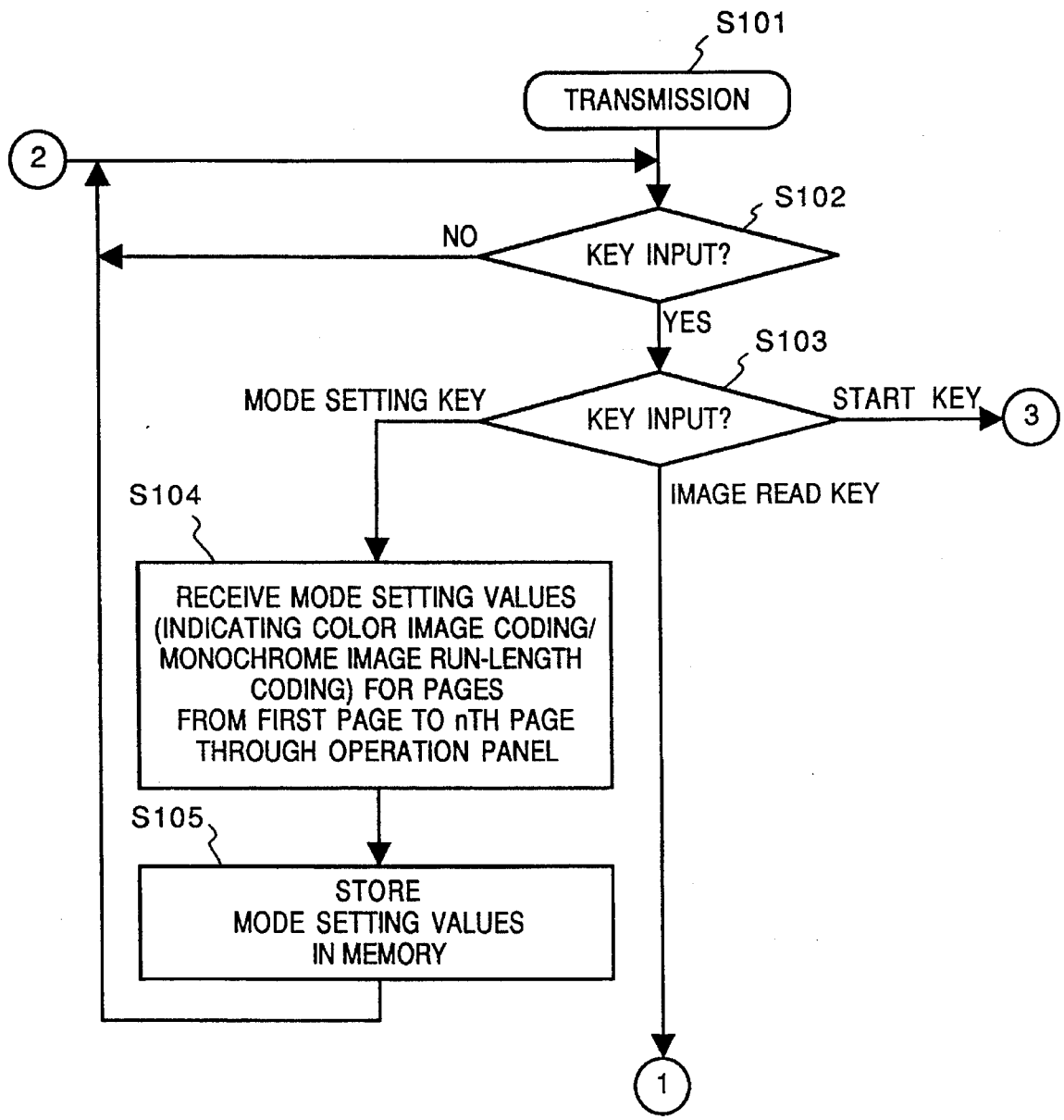
FIGS. 2A, 2B, 3, 4, 5A and 5B are flow charts showing image transmission processing in the embodiment.

When document data transmission is to be performed, processing in step S101 in FIG. 2A is started. In step S101, a document to be read first is set on the scanner 101. A mode setting key is then operated through the operation panel 113 to perform mode setting for each page so as to determine whether the document is to be transmitted upon color image coding or monochrome image run-length coding. With this processing, the flow advances to steps S104 and S105 through steps S102 and S103 to store the input mode setting value for each page in the memory 105.

Subsequently, a switch for starting a document read operation (this key will be referred to as a image read key hereinafter) is operated through the operation panel 113.

With this processing, the flow advances from step S103 to step S106 and the subsequent steps.

In step S106, the image read key is operated to read out the mode setting value for the nth page to be read. In step S107, the set document is read by the scanner 101 in units of pages.

If it is determined in step S108 that the storage pattern set by the user soft switch is (1) SINGLE mode, the flow advances to S109. If it is (2) AUTO mode, the flow advances to step S112.

(1) SINGLE mode is a mode in which the apparatus on the other end of the line has the same coding schemes as those of the apparatus of the embodiment. In this case, since only necessary compressed data is to be stored, image processing of the read image data is performed by the image processor 103 in accordance with the mode setting value. That is, if it is determined in step S109 that the setting value for the document during scan processing represents "color coding scheme", e.g., if the mode setting value is "0" and "color" is determined, the flow advances to step S110 to store image data coded by the color image coding scheme. The flow then advances to step S114.

If the mode setting value is "1" and "run-length" is determined, the flow advances to step S111 to store image data coded by the monochrome image run-length coding scheme. The flow then advances to step S114.

The color code storage processing subroutine in step S110 will be described in detail below with reference to FIG. 3.

In color code storage processing, the image data input by the scanner 101 is subjected, as color image data, to image processing in step S201. In step S202, the image data is stored, as color image data, in the buffer 104. The flow then advances to step S203 to check the setting value set in steps S104 and S105 so as to switch the coding scheme to the color image coding scheme by using the switching unit 110. In step S204, the color image data is read out from the buffer 104, and color image coding of the data is performed by the color codec section 108. In step 205, the resultant compressed data is stored in the hard disk 107, and the routine is ended.

The monochrome image run-length code storage processing subroutine in step S111 will be described in detail below with reference to FIG. 4.

In step 207, the image processor 103 performs image processing including monochrome conversion with respect to the image data input by the scanner 101. In step S208, the image data is stored, as monochrome image data, in the buffer 104. In step S209, the previous setting value is checked to switch from the color codec section 108 to the monochrome image run-length codec section 109 through the switching unit 110. In step S210, the image data is read out, and monochrome image run-length coding of the data is performed by the run-length codec section 109. In step S211, the resultant compressed data is stored in the hard disk 107.

Figure 2B:
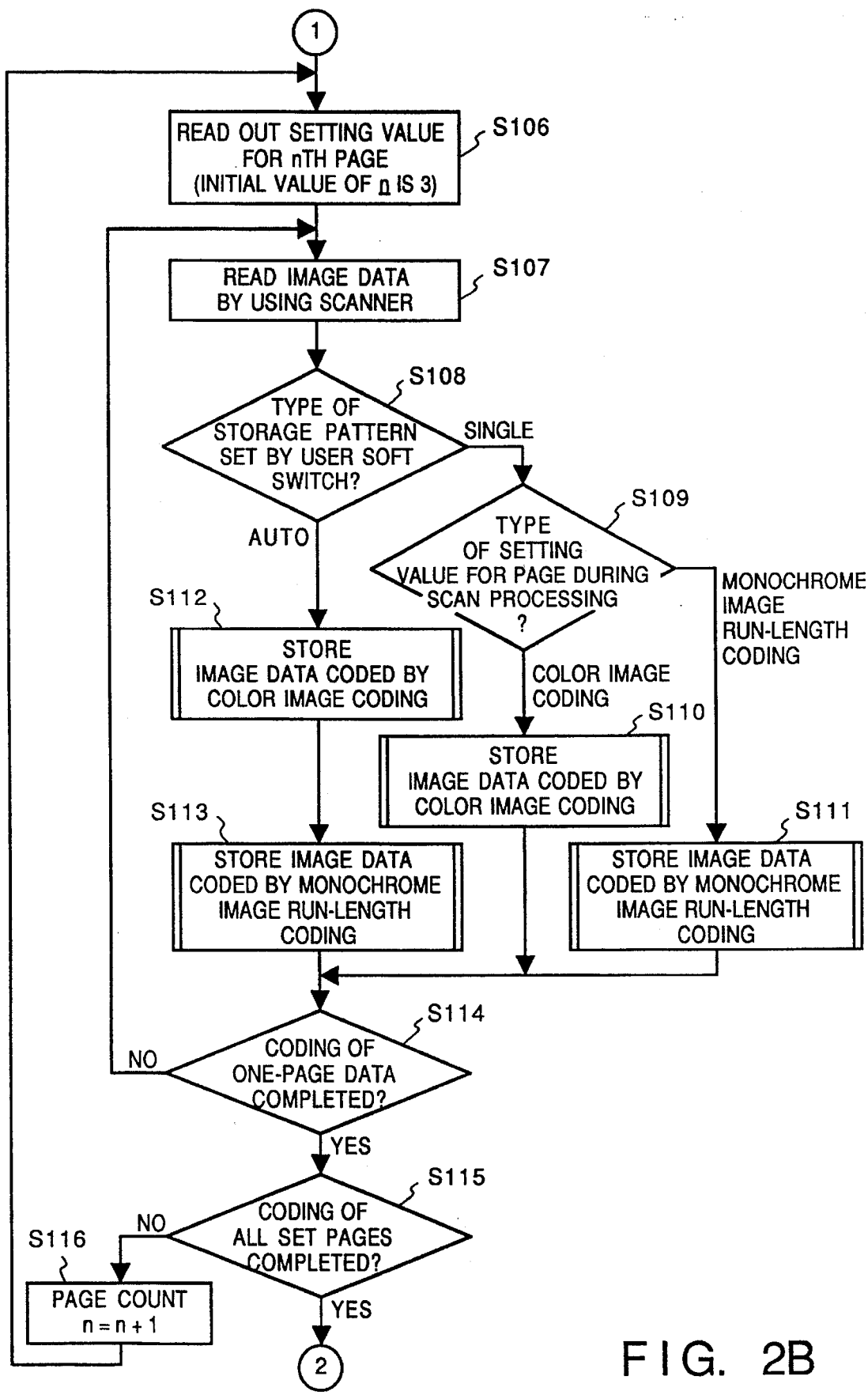

When the above-described storage processing is completed, the flow advances to step S114 in FIG. 2B to check whether coding of one page is completed. If NO in step S114, the flow returns to step S107. This image processing is repeated until coding of one page is completed. That is, a coding scheme suitable for each image data is selected, and either compressed color data or compressed monochrome data is stored in the hard disk 107.

If YES in step S114, the flow advances to step S115 to check whether coding of all the set pages is completed. If NO in S115, the flow advances to step S116 to increment the page count by one, and the flow returns to step S106 to repeatedly perform the same processing as described above, starting from the operation of reading out the setting value for the next page.

If it is determined in step S115 that coding of all the pages is completed, the flow returns to step S102 to execute the initial key input wait processing. If another page is added, data read/coding processing is performed in the same manner as described above (steps S104 to S116), and the flow returns to the step of initial key input wait processing in the same manner as described above.

Figure 5A:
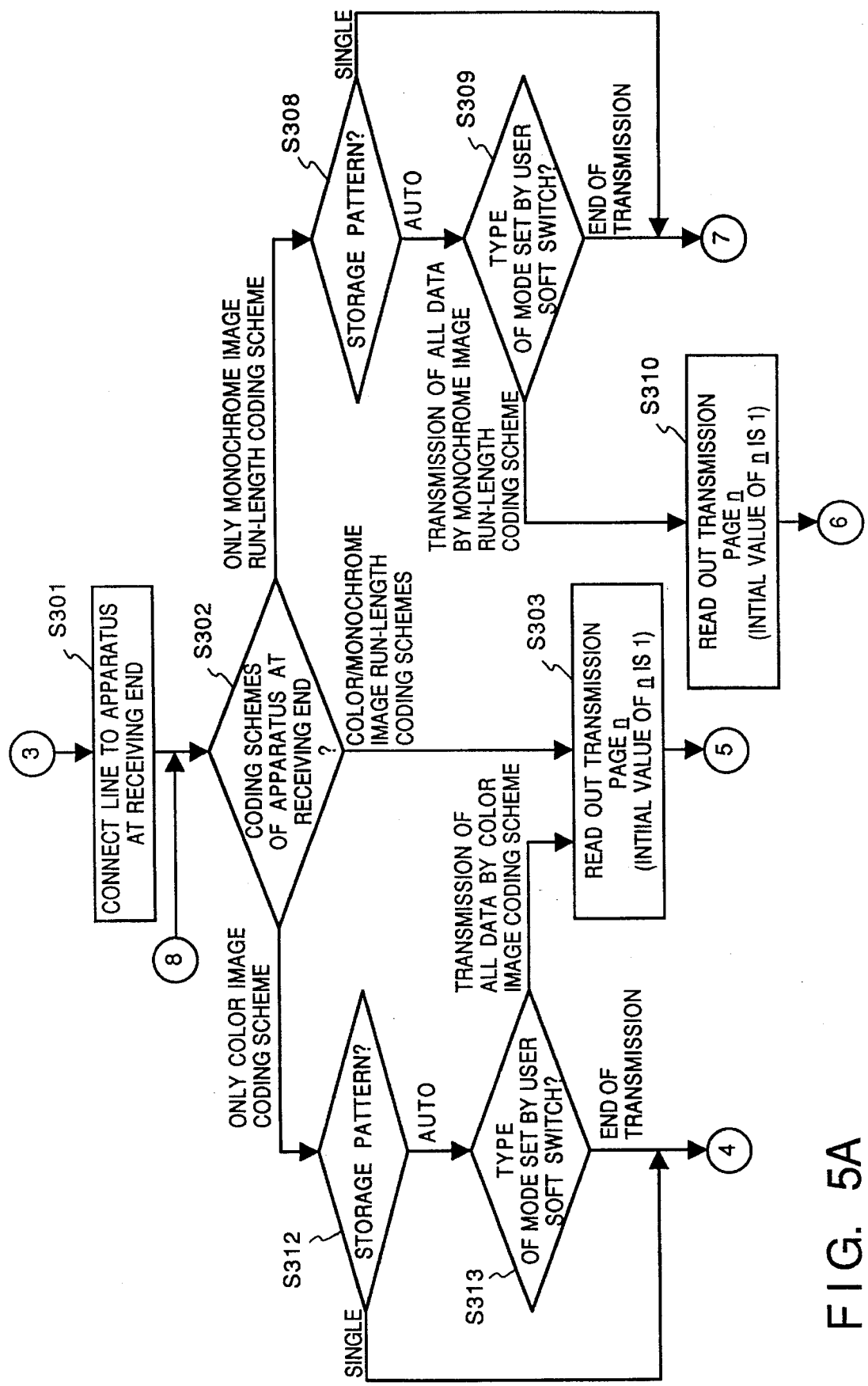
Figure 5B:
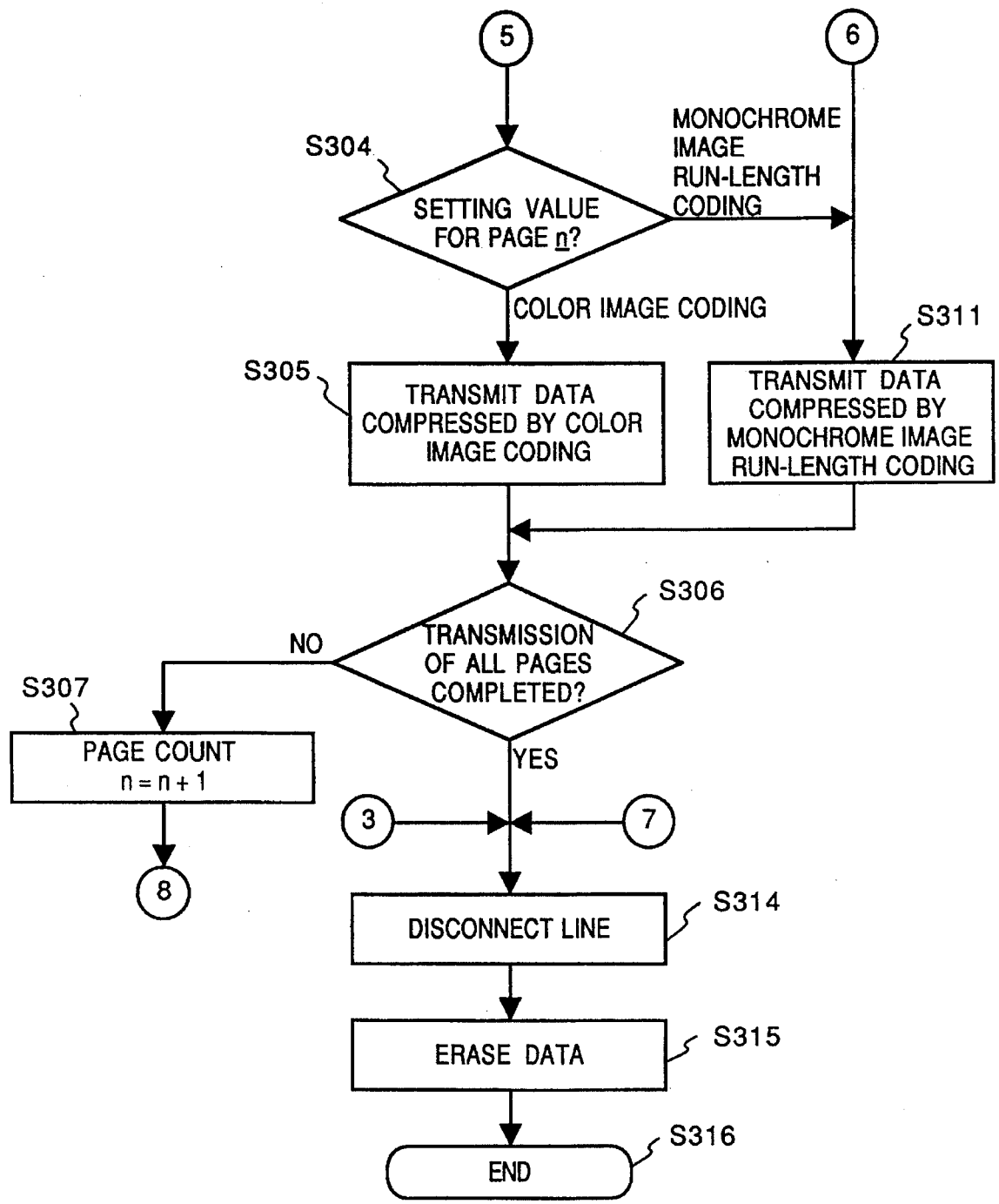

When a start key is operated, the flow jumps from step S103 to the transmission processing shown in FIGS. 5A and 5B.

If it is determined in step S108 in FIG. 2B that the storage pattern set by the user soft switch is (2) AUTO mode, the apparatus at the other end of the line may not have the same coding schemes as those of the embodiment of the embodiment. Even in such a case, communication may be required to be performed by using a coding scheme which the apparatus on the other end of the line can handle.

Figure 3:
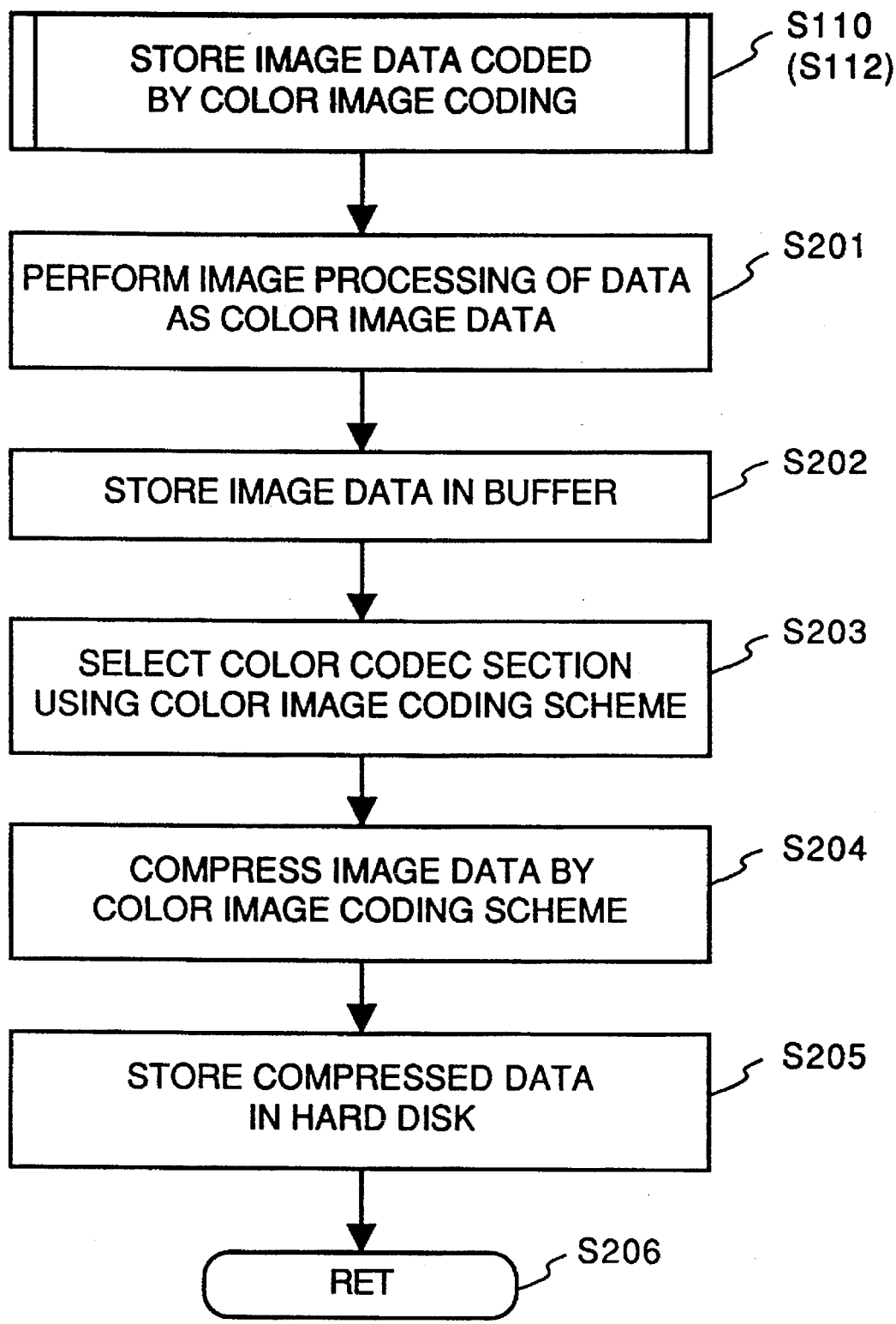
Figure 4:
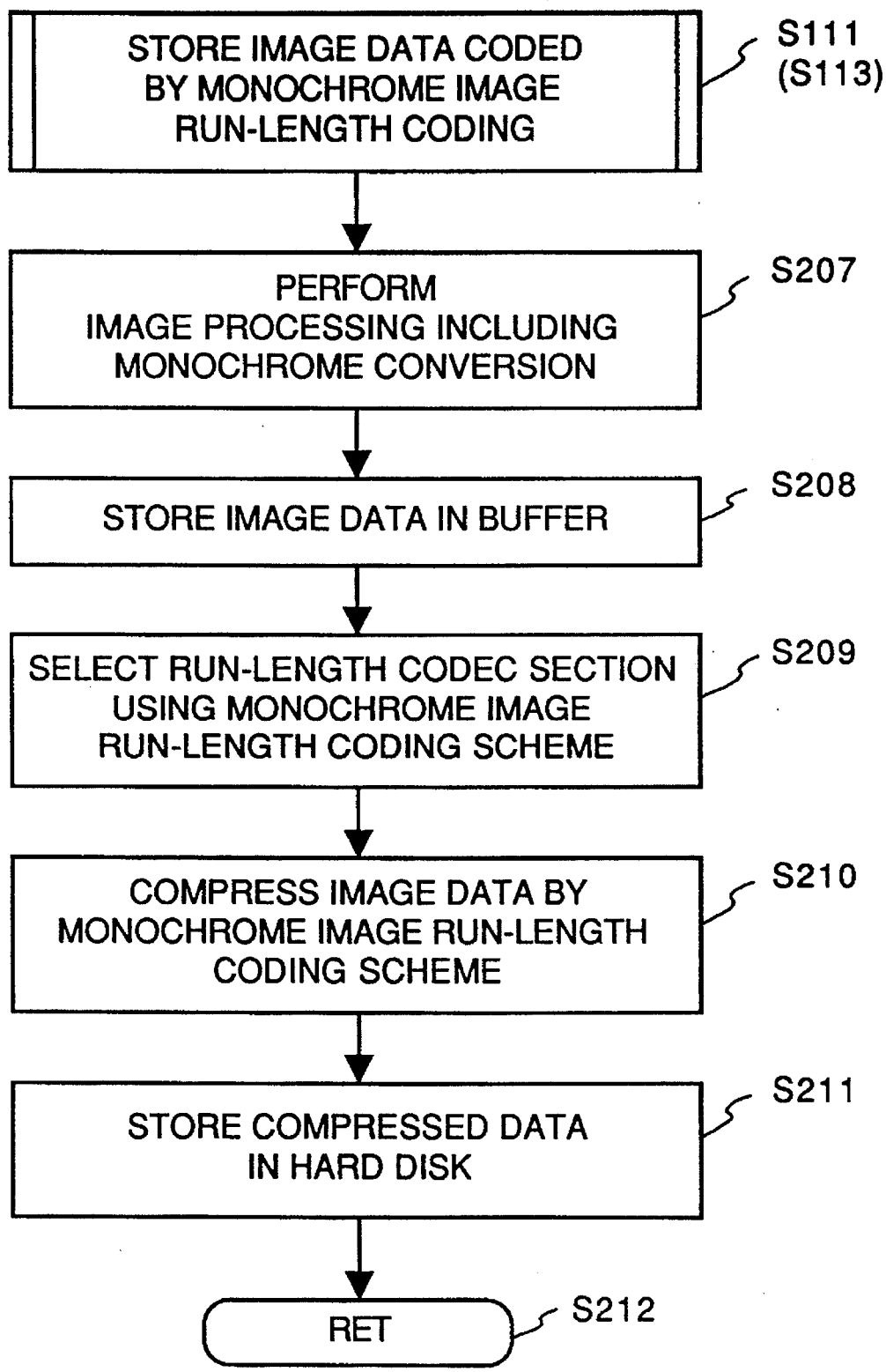

For this purpose, according to the embodiment, when the AUTO mode is set, the read image data is processed by the two coding schemes, i.e., color image coding shown in FIG. 3 (step S112) and monochrome image run-length coding shown in FIG. 4 (step S113) in steps S112 and S113, and the respective resultant data are stored in the hard disk 107.

More specifically, in step S112, similar to the case of the SINGLE mode shown in FIG. 3, after image processing is performed, the data compressed by the color image coding scheme is stored in the hard disk 107. In step S113, similar to the case of the SINGLE mode shown in FIG. 4, after image processing including monochrome. conversion is performed with respect to the image data, the resultant data is compressed by the monochrome image run-length coding scheme and is stored in the hard disk 107.

The flow then advances to step S114, and this image processing is repeated (steps S106 to S108 and steps S112 to S114) until one-page image data is completely processed. Upon completion of image processing of one-page image data, the flow returns to the step of key input wait processing. That is, it is checked whether all the set pages are processed (step S115). If NO in step S115, the processing is repeated (step S116, steps S106 to S118, and steps S112 to S115), starting from the step of reading out the setting value for the next page. If image processing of all the pages is completed, the flow returns to the step of initial key input wait processing (step S102).

If another page is added, data read/coding is performed (steps S104 to S108 and steps S112 to S116) in the same manner as in the SINGLE mode described above, and the flow returns to the step of initial key input wait processing. That is, in (2) AUTO mode, two data, i.e., compressed color data and compressed monochrome data are stored/held in the hard disk 107 for each image data.

When image data to be transmitted are sequentially stored in the hard disk 107 in the above-described manner, the start key is operated to transmit the stored data to the apparatus at the other end of the line. When the start key is operated, the flow advances from step S103 in FIG. 2A to step S301 in FIG. 5A.

Data transmission to an apparatus on the other end of a communication line will be described below with reference to the flow chart shown in FIGS. 5A, 5B and the communication control procedures based on the flow chart and shown in FIG. 6.

In transmission, line connection processing is performed first by the line controller 111 with respect to an apparatus on the other end of the line, e.g., another apparatus 300, connected to the network 200 in step S301. In this case, in a session layer procedure of the transmission control procedures shown in FIG. 6, the coding schemes (the color image coding scheme and the monochrome image run-length coding scheme) of the apparatus of the embodiment are informed by using a NSC(non-standard function command) as a parameter of a CSS(session start command). In step S302, the coding scheme or schemes of the apparatus on the other end of the line is identified by a RSSP (session start positive response) received from the apparatus on the other end of the line.

If it is determined on the basis of the RSSP that the apparatus on the other end of the line is also capable of performing both the color image coding scheme and the monochrome image run-length coding scheme, the flow advances from step S302 to step S303, and a setting value for each page is checked, as in step S304, starting from the first transmission page (step S303). Compressed image data coded by color image coding or compressed image data coded by monochrome image run-length coding is selected in accordance with the setting value, and the selected compressed image data is transmitted while information indicating whether color image coding or monochrome image run-length coding is performed is set in a header added to the image data (step S305 or S311). This processing is repeated until transmission of all the pages is completed (steps S306 and S307).

Figure 6:
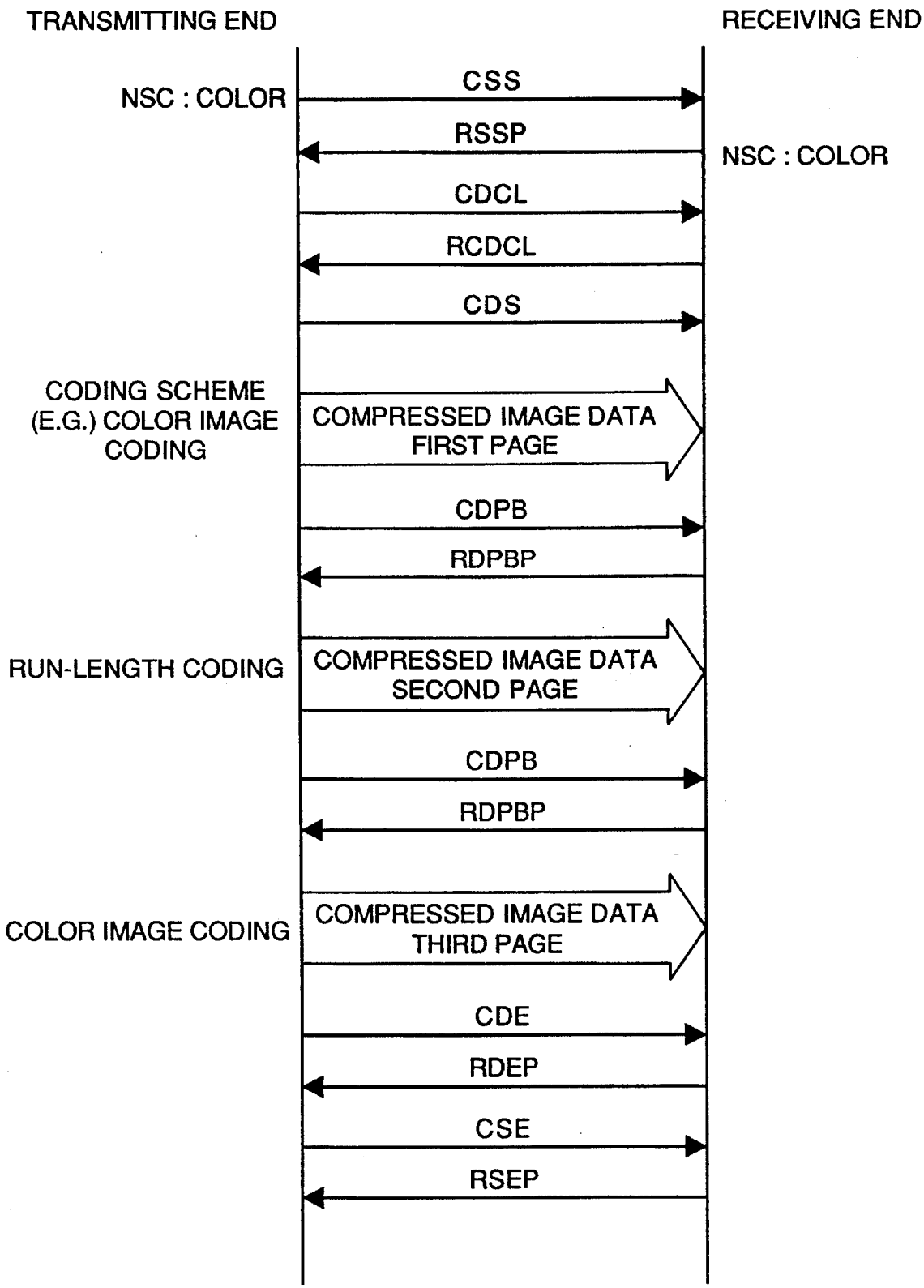
FIG. 6 is a view showing image transmission control procedures in the embodiment.

In above-mentioned step S304, whether the image of a page to be transmitted next is coded by color image coding or by monochrome image run-length coding is determined by transmitting a CDPB and to receive a RDPBP as shown in FIG. 6, and then the determination is notified.

When the transmission is completed, the line is disconnected in step S314, and unnecessary data is erased in step S315, thus completing the processing (S316).

In this case, as described above, in both (1) SINGLE mode and (2) AUTO mode, image data coded by color image coding and monochrome image run-length coding in accordance with a mode setting value for each page are held. Therefore, compressed data processed by color image coding or compressed data processed by run-length coding can be transmitted in step S305 or S311 without being imposed by special limitations, only by selecting one of the coding schemes.

If it is determined in step S302 that the apparatus on the other end of the line employs only the monochrome image run-length coding scheme, the flow advances to step S308. Similarly, if it is determined in step S302 that the apparatus on the other end of the line employs only the color image coding scheme, the flow advances to step S312. In either case, the flow branches from step S308 or S312 to the SINGLE mode or the AUTO mode in accordance with a storage pattern set by the user soft switch. In the case of the SINGLE mode, since the apparatus on the other end of the line employs a single coding scheme, transmission cannot be performed. Therefore, in both the cases, the flow advances to step S314 to terminate the transmission processing.

In the case of the AUTO mode, the flow advances to step S309 or S313 to check a mode set by the user soft switch. If the mode set by the user soft switch is the mode of terminating transmission or is not a mode of transmitting data by a coding scheme which an apparatus on the other end of a line can handle, which will be described later, the flow advances to step S314 to terminate the transmission.

If the mode set by the user soft switch is the mode of transmitting data by a coding scheme which an apparatus on the other end of a line can handle, the transmission processing is continuously performed by using a coding scheme which the apparatus on the other end of the line can handle. More specifically, if only the monochrome image run-length coding scheme can be used, the flow advances to step S310 and the subsequent steps, thus selecting compressed data processed by the monochrome image run-length coding scheme for all the transmission pages, and transmitting the compressed data while setting information indicating monochrome image run-length coding in a header.

In contrast to this, if only color image coding scheme can be used, the flow advances to step S303 and the subsequent steps, thus selecting compressed data processed by the color image coding scheme for all the transmission pages, and transmitting the compressed data while setting information indicating color image coding in a header. In either case, after transmission of the data of all the pages is completed, the line is disconnected, and unnecessary data is erased. With this operation, the transmission processing is completed (steps S314 to S316).

Although the above description exemplifies transmission according to the embodiment of the present invention, the present invention can be applied to a case wherein the above-described transmission is performed with respect to the apparatus of the embodiment. In this case, the coding schemes employed by the apparatus at the transmitting end and the apparatus of the embodiment are determined on the basis of "CSS" and "RSSP" and received data coded by the color image coding scheme or the monochrome image run-length coding scheme is decoded by a corresponding decoding scheme.

As described above, according to the embodiment, when transmission document data having both color and monochrome document data is to be transmitted, since the coding schemes can be switched in units of pages during one communication cycle, the following advantages can be obtained.

(1) In transmission of monochrome document data, the color image coding scheme need not be used, thereby effectively preventing an increase in cost due to printing of a black portion in three colors, i.e., red, green, and blue, unnecessary coloring of a white portion, and blurring of a color at an edge portion of a character or the like.

(2) In transmission of color document data, the monochrome image run-length coding scheme need not be used, thereby preventing the inconvenience that the color document data can only be transmitted as monochrome image data.

(3) Transmission document data including both color and monochrome image document data can be transmitted in one communication cycle, thereby preventing an increase in transmission cost for separately transmitting color document data and monochrome document data. In addition, a cumbersome operation of sorting documents need not be performed.

In addition, according to the embodiment, the apparatus has a function of communicating coded data corresponding to an apparatus on the other end of a communication line after line connection is performed, and coding schemes which the apparatus on the other end of the line can handle are checked. Therefore, even if coding schemes which the apparatus on the other end of the line can handle are not checked in advance, since code data corresponding to the coding function of the apparatus on the other end of the line is prepared, smooth transmission can be performed without repeating a coding operation.

Other Embodiments

In the above-described embodiment, a storage pattern is set by the user soft switch. However, the present invention is not limited to this. The image read key may be replaced with two keys, i.e., a "selection image read key" and an "automatic image read key" corresponding to (1) SINGLE mode and (2) AUTO mode so that the two modes can be switched by a key input.

Similarly, in this case, in (2) AUTO mode, an apparatus at the receiving end may not have the same coding schemes as those of an apparatus at the transmitting end. In setting modes by means of the user soft switch to perform communication by coding schemes which the apparatus at the transmitting end can handle, in addition to the above-described setting values, a setting value indicating "If an apparatus at the other end of a line employs only the color image coding scheme, only data coded by color image coding is transmitted" and a setting value indicating "If an apparatus at the other end of a line employs only the monochrome image run-length coding scheme, only data coded by monochrome image run-length coding is transmitted" can be set by using mode setting values.

In addition, in the above embodiment, mode setting values indicating color/monochrome image run-length coding schemes for several pages are stored in the memory 105 through the operation panel 113 in the order in which they are read in advance by the scanner, and a mode setting value is read out from the memory 105 every time coding of one-page data is completed. Therefore, the present invention can be applied not only to transmission of book document data but also transmission of data automatically read by an ADF unit. Furthermore, the color/monochrome image run-length coding modes can be switched through the operation panel 113 every time one-page data is read by the scanner.

In the above embodiment, processing of image data is performed in units of pages. However, the size of each block may be arbitrarily set in accordance with the capacity of the buffer 104.

As a scan method of reading a document, an arbitrary method such as a raster scan method or shuttle scan method can be employed.

In the above embodiment, scanning/transmission is performed from the first page. However, one or both of scanning and transmission can be performed from the last page by changing page setting and UP CONT/DOWN setting.

Note that the present invention may be applied to a system constituted by a plurality of units and to an apparatus constituted by one unit.

Furthermore, it is clear that the present invention can be applied to a case wherein data transmission can be realized by supplying a program to a system or an apparatus.

As has been described above, according to the present invention, even transmission document data including both color and monochrome document data can be coded by the coding schemes suitable for the two types of data, and the coded data can be transmitted in one communication cycle.

Moreover, since coded data corresponding to an apparatus on the other end of a communication line is used for communication after coding schemes which the apparatus on the other end of the line can handle are checked upon line connection, smooth transmission can be performed even if coding schemes which the apparatus on the other end of the line can handle are not checked in advance.

It should be noted that in FIG. 6, "CDCLP" stands for a command for document capability list positive; "RDCLP", a response of document capability list positive; "CDS", a command for document start; "CDPB", a command for document page boundary; "RDPBP", a response of document page boundary positive; "CDE", a command for document end; "RDEP", a response of document end positive; "CSE", a command for session end; and "RSEP", a response of session end positive.

In this embodiment, a CDPB command is transferred and a RDPBP response is received for each page so as to determine whether a page to be transmitted is a color image or a monochrome image and notify the determination to an apparatus at the other end of a communication line.

Figures 7, 8:
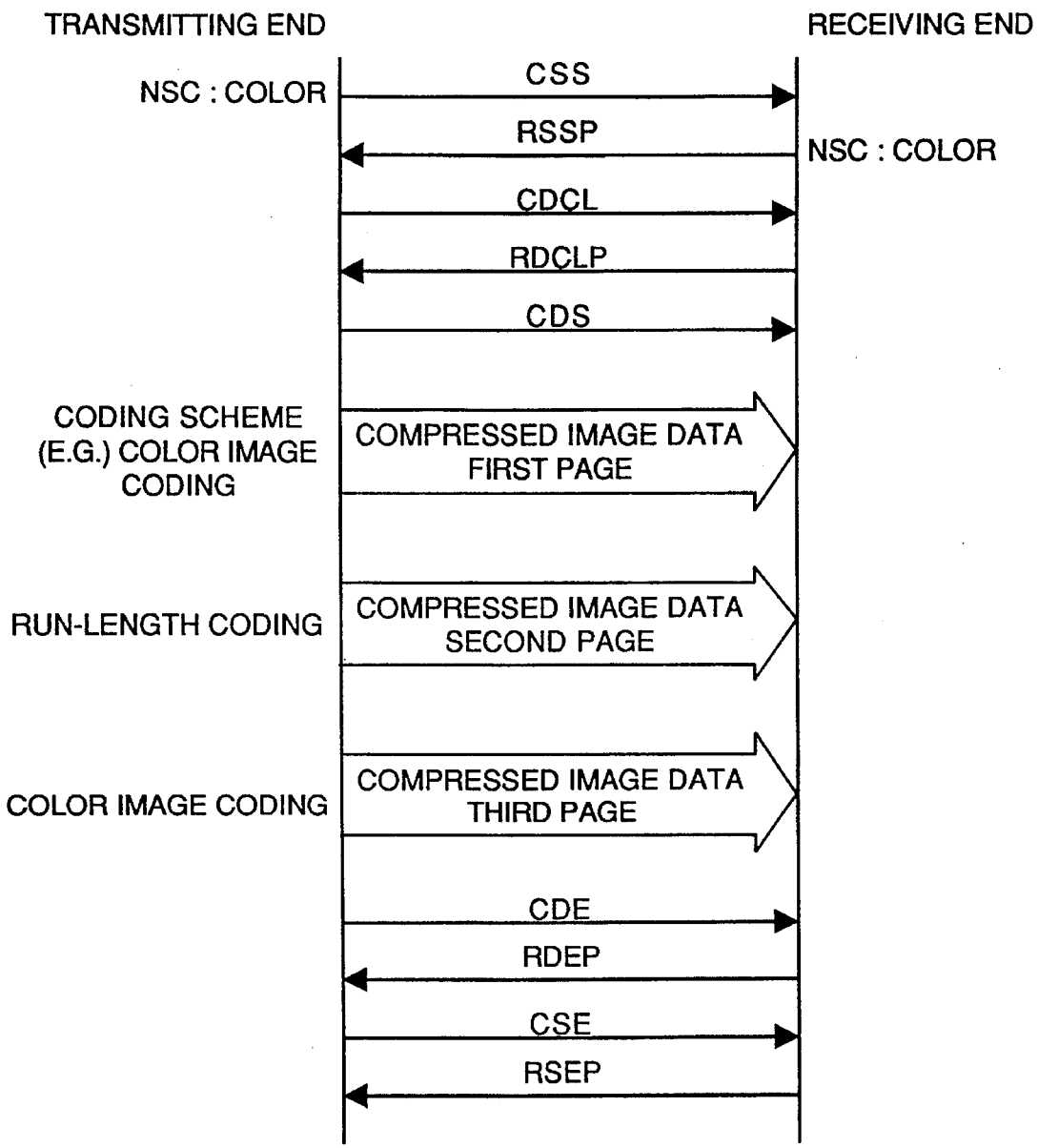
FIG. 7 is a diagram showing a modification to the image transmission control procedures in FIG. 6.
FIG. 8 is a diagram showing in detail a header of compressed image data.

FIG. 7 shows a modification to the image transmission control procedures in FIG. 6 In the modification, compressed image data can be transmitted without transmitting a CDPB and receiving a RDPBP for each page.

FIG. 8 shows in detail a header of the above compressed image data.

As shown in FIG. 8, in the header, three bits are assigned to sheet size. For example, sizes A4, B4, B5, A3 and A5 are respectively discriminated.

Another three bits are assigned to an image compression scheme. For example, MMR (modified MR) scheme, JPEG (joint photographic coding experts group) scheme and JBIG (joint bi-level coding experts group) scheme can be discriminated.

Further, two bits are assigned to color/monochrome discrimination. Whether a page to be transmitted is a color image or a monochrome image, or the both can be discriminated.

Next, another embodiment of the present invention will be described below with reference to FIGS. 9 to 12. The following description is based on the assumption that an image transmission apparatus is a color/monochrome facsimile apparatus connected to an ISDN.

Figure 9:
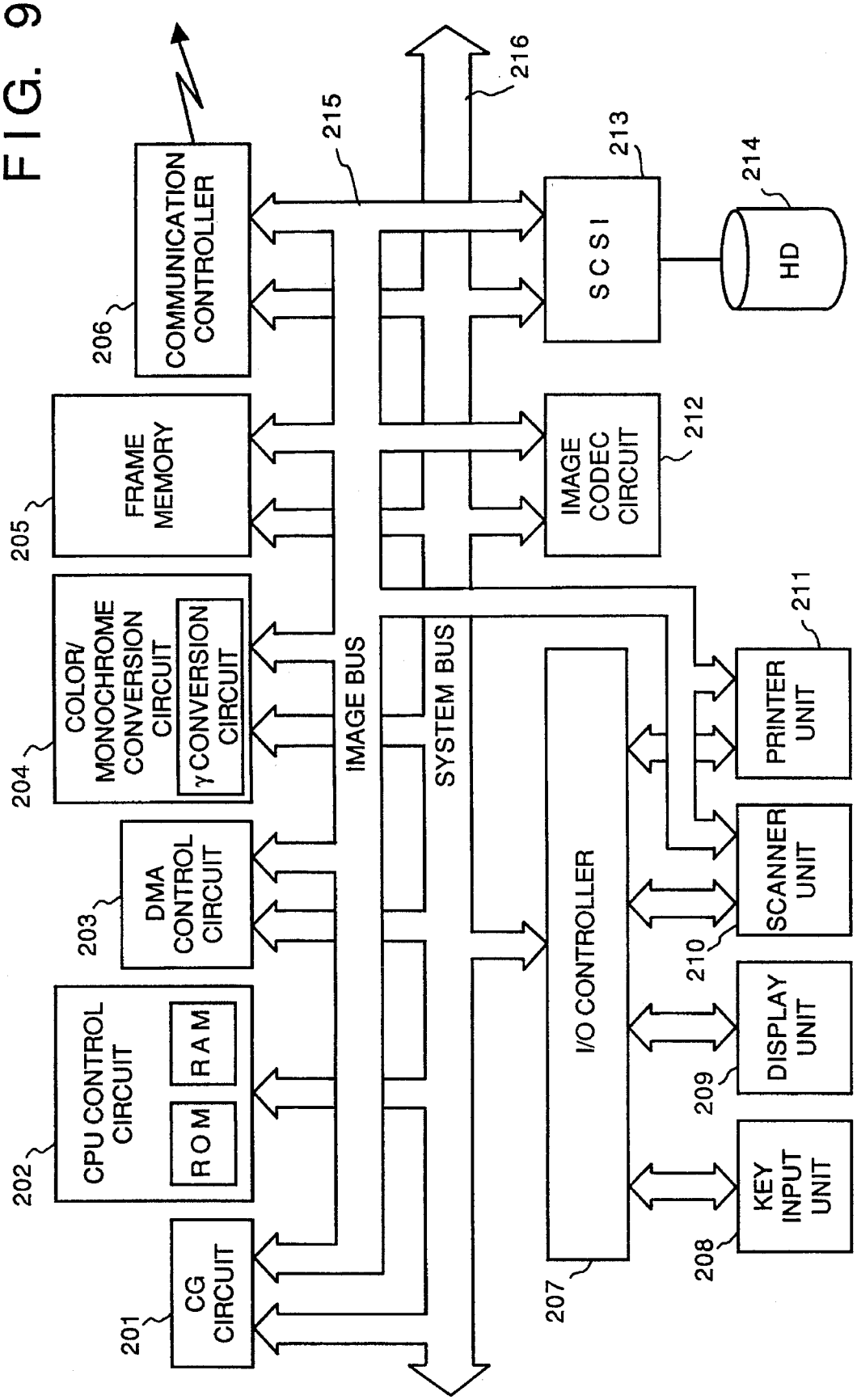
FIG. 9 is a block diagram showing a color facsimile apparatus according to another embodiment of the present invention.

FIG. 9 is a block diagram showing a color/monochrome facsimile apparatus in the embodiment. In FIG. 9, reference numeral 201 denotes a CG (character generator) circuit for generating fonts to be printed in various reports and page headers or the like; 202, a CPU control circuit, including a ROM and a RAM, for controlling the overall apparatus; 203, a DMA (direct memory access) control circuit for transferring image data among memories without the CPU 202; 204, a color/monochrome conversion circuit, including a γ conversion circuit which converts a CMYK image into RGB image or conversely, RGB image into a CMYK image, for converting a color image into a monochrome image and converting a multi-level image to a binary image; 205, a frame memory for developing image data for each block; 206, a communication controller for controlling calling/receiving-call process and data transmission/reception process between an apparatus at the other end of a communication line using a communication protocol.

Reference numeral 207 denotes an I/O controller for controlling a key input unit 208, a display unit 209, a scanner unit 210 and a printer unit 211. The key input unit 208 receives instructions from an user by key entry (using e.g., a single-touch key, ten-keys, a start key and a stop key). The display unit 209 notifies various information (e.g., "memory full", "out of paper" "out of ink" and a communication status) to the user with a message displayed on a LCD or on/off of a LED. The scanner unit 210 reads an original in a designated mode (e.g., "sheet size", "character/photograph", "density" and "color/monochrome"). The printer unit 211 outputs image data and character data on a recording sheet. Numeral 212 denotes an image codec (coding/decoding) circuit for compressing and expanding color/monochrome image data; 213, a SCSI (small computer system interface) for a hard disk; 214, a non-volatile memory (hard disk); 215, an image bus for image data; 216, a system bus for the overall system.

Figure 10:
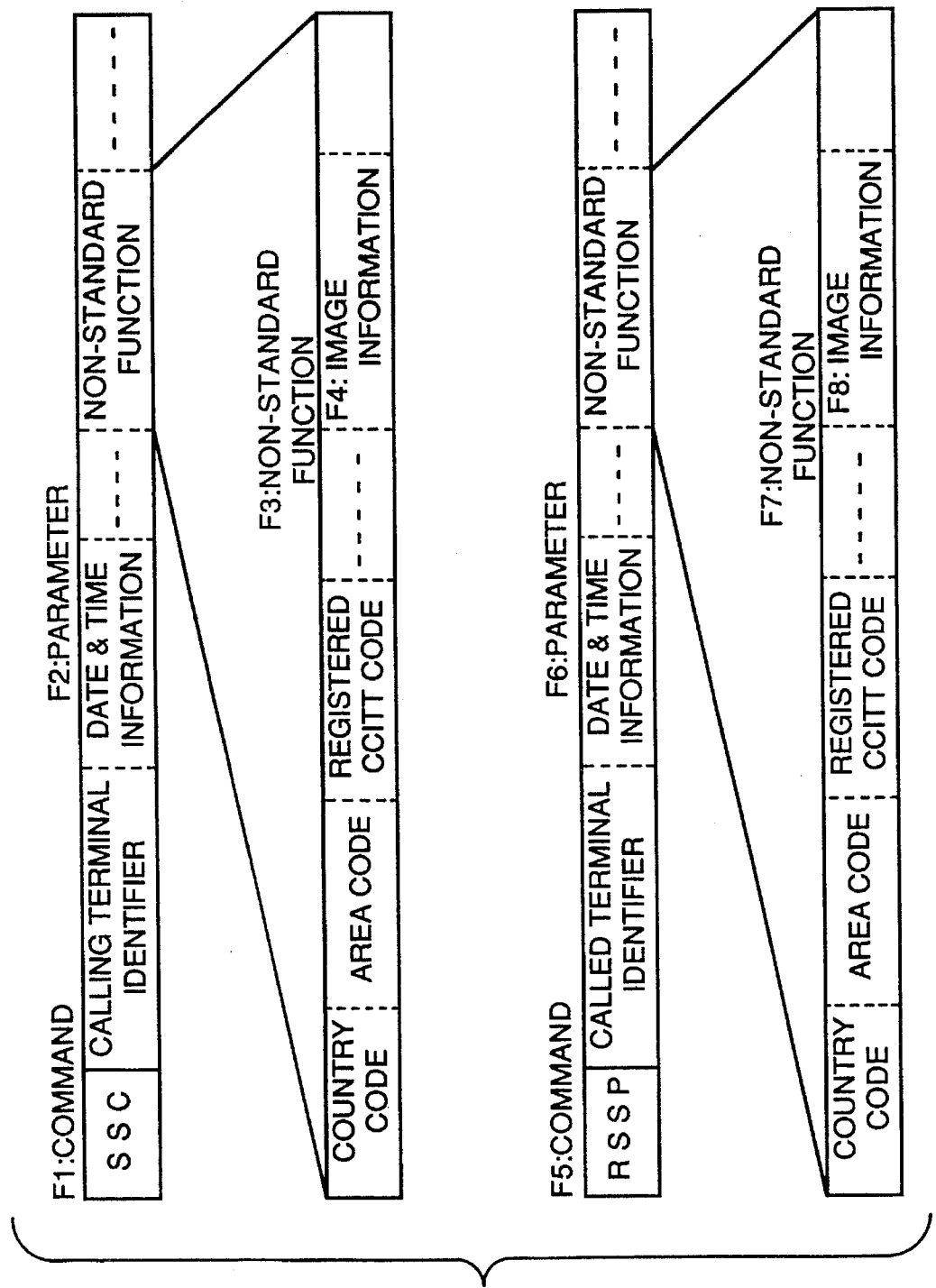
FIG. 10 is a diagram showing a format of a CSS and a RSSP.

FIG. 10 shows an example of a parameter format of a CSS (command for session start) command and a RSSP (response of session start positive) command. In FIG. 10, F1 (field 1) is for the CSS command and F2, parameters of the CSS command. F3 is for a parameter "non-standard function" included in F2. F4 included in F3 is a field storing image information. F5 is for a RSSP command and F6, parameters of the RSSP command. F7 is for a parameter "non-standard function" included in F6. F8 included in F7 is a field where image information is set.

A color image transmission sequence in this embodiment will be described below with reference to a flow chart in FIG. 11 and a communication protocol sequence in FIG. 4.

Figure 11:
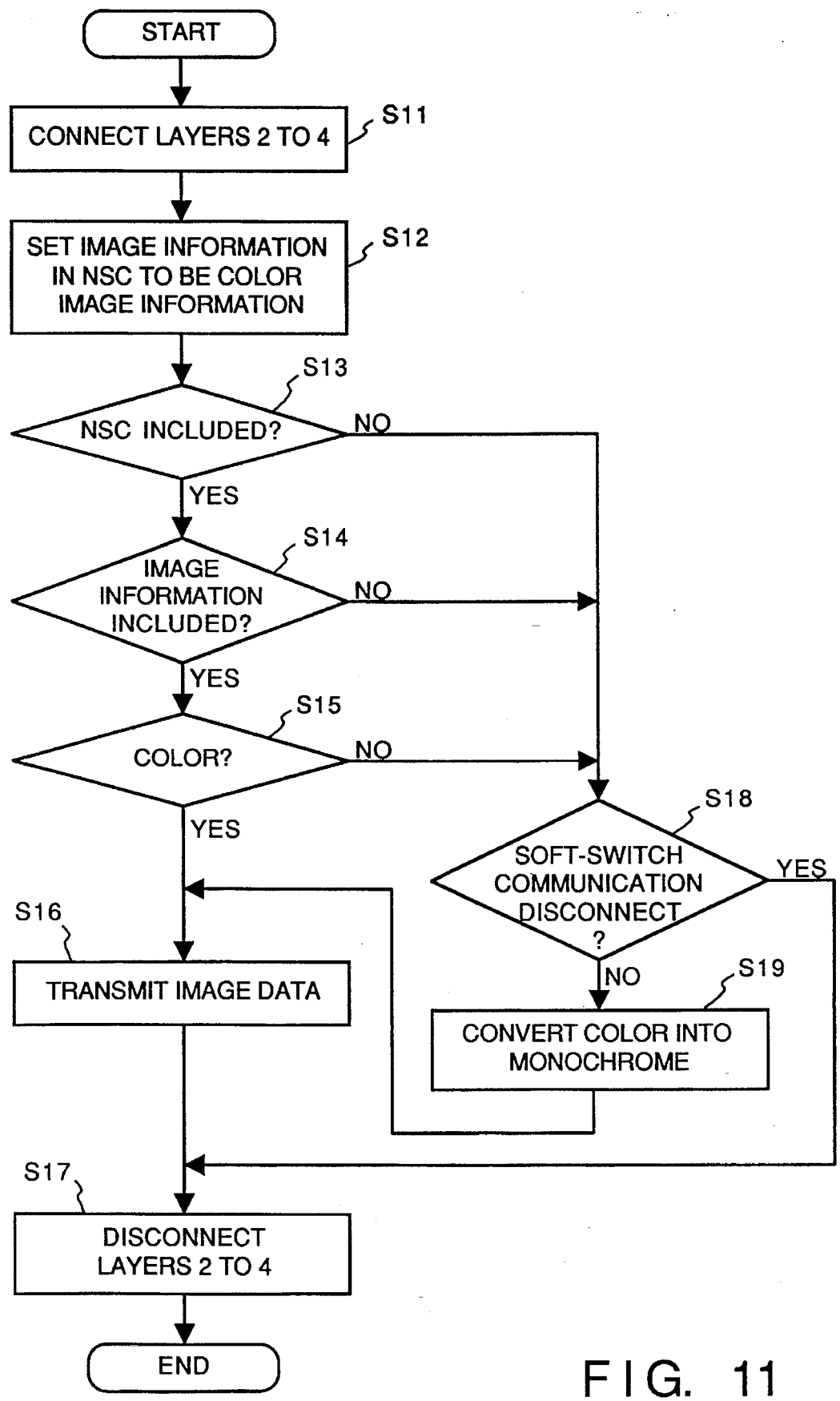
FIG. 11 is a flow chart showing a color image transmission sequence in the embodiment.
Figure 12:
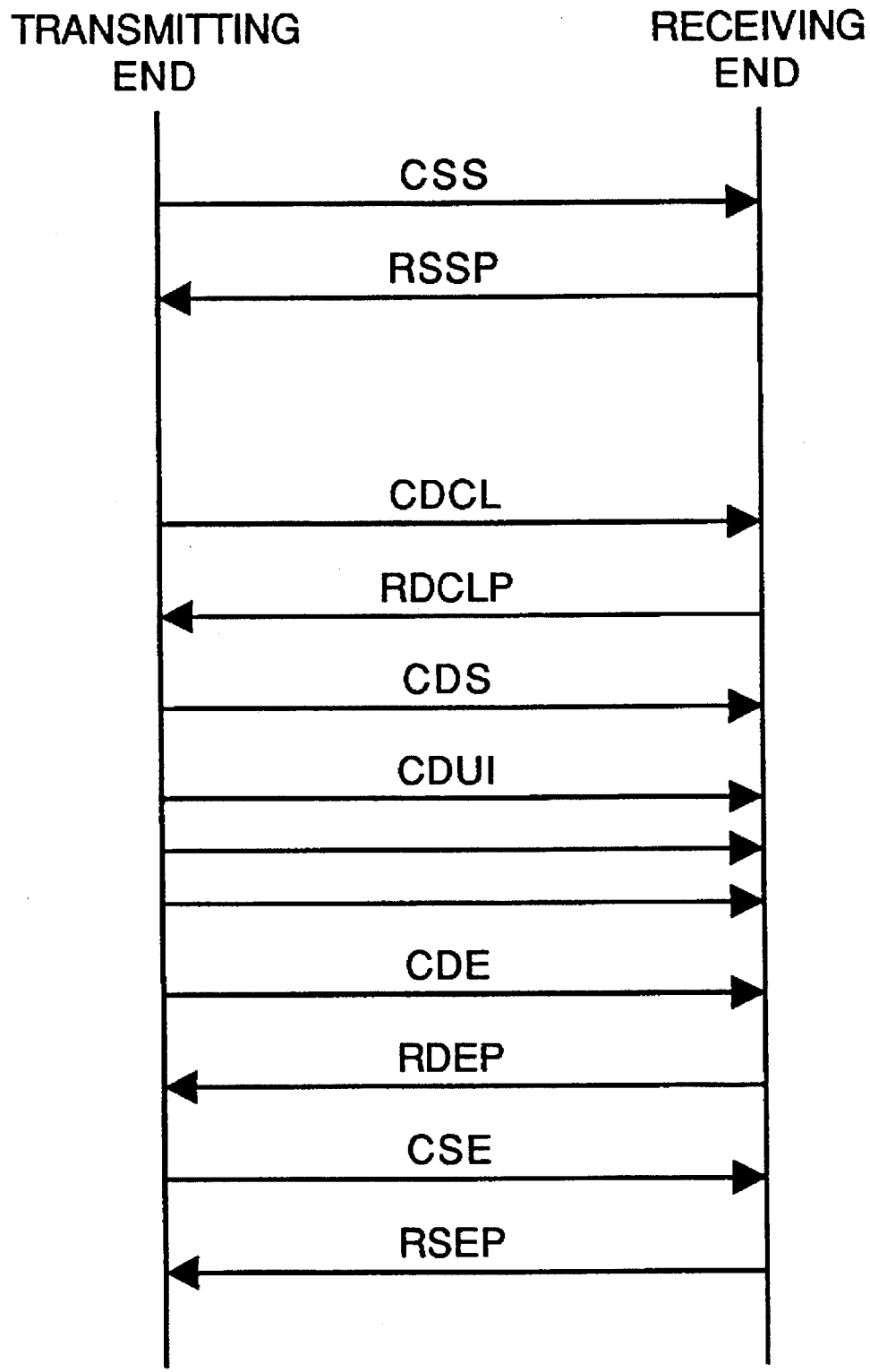
FIG. 12 is a diagram showing a communication protocol sequence in the embodiment.

In FIG. 11, first, transmission is started by an operator's instruction, and the flow advances to step S11, where layers 2 to 4 are connected by the communication controller 206. In step S12, the parameter which identifies the image information included in the non-standard function parameter of the CSS command shown in FIG. 10 is set to be a color image information. As shown in FIG. 12, the CSS command is transmitted to a facsimile at the other end of a communication line, and when the RSSP response is received, the flow advances to step S13, in which whether a parameter of the received RSSP includes a NSC (non-standard function command) is checked. If the parameter includes a NSC, the flow proceeds to step S14 in which whether the NSC includes a parameter indicating image information is checked. If the NSC includes a parameter indicating image information, contents of the parameter of image information is checked in step S15. If it indicates a color image, a CDCL (command document capability list) command is transmitted to the facsimile on the receiving side as shown in FIG. 12, and a RDCLP (response document capability list positive) command is received.

In step S16, after a CDS (command document start) command has been transmitted, image data transmission is performed using a plurality of CDUI commands. When the whole transmission is completed, a CDE (command document end) is transmitted. Thereafter, a RDEP (response document end positive) from the receiving side is received, and a CSE (command session end) is transmitted. When a RSEP (response session end positive) is received, the flow advances to step S17, where the layers 2 to 4 are disconnected and the transmission process is terminated.

On the other hand, it is decided that the parameter of the CSS does not include a NSC in step S13, or it is decided that the NSC does not include image information in step S15, or further it is decided that the content of the image information is not a color image in step S16, the flow advances to step S18 in which whether a current mode is for disconnecting the communication is checked by examining the content of a soft switch. If it is in a disconnection mode, a CSE is transmitted and a RSEP is waited, then the process proceeds to step S17. However, if it is not in the disconnection mode, the flow advances to step S19 where well known conversion of color image data into monochrome image data by the color/monochrome conversion circuit 204 is performed, and then, as described above, a CDCL is transmitted and a RDCLP is waited. Thereafter, the flow returns to step S16 where the image data converted into monochrome are transmitted.

As described above, according to this embodiment, which document data of color or monochrome the apparatus on the receiving side can handle can be confirmed by transmitting a CSS and receiving a RSSP in the session layer. By this arrangement, image data transmission can be performed regardless of color or monochrome document data which the apparatus on the receiving side handles. In case where an original including an image which must be received as a color image, if the apparatus on the receiving side is a monochrome facsimile, the communication line can be disconnected in mid-course.

In the above-described embodiment, a NSC which is a parameter of B channel in an ISDN is used, however, other parameters such as HLC and UUI which are parameters of D channel in the ISDN can be employed.

Further, in the embodiment, image conversion of color image data to monochrome image data is performed when it is found that the apparatus on the other end of the communication line is not a color facsimile. However, the image conversion can be performed during image data transmission.

According to the present invention, there can be provided a color facsimile apparatus which discriminates whether a facsimile apparatus on the other end of a communication line handles color document data or monochrome document data and performs communication of the data. As the apparatus according to the present invention comprises the discrimination means for discriminating if document data which the facsimile at the receiving end handles is color or monochrome and the communication control means for controlling communication in accordance with discrimination result by said discrimination means, it can control to continue the communication corresponding to document data which the apparatus at the receiving end handles.

The present invention is not limited to the run-length coding scheme as a monochrome image coding scheme, an arithmetic coding scheme can be used.

As many apparently widely different embodiments of the present invention can be made without departing from the spirit and scope thereof, it is to be understood that the invention is not limited to the specific embodiments thereof except as defined in the appended claims.

What is claimed is:

1. An image transmission apparatus comprising:

color image coding means;

monochrome image coding means;

means for transmitting a CSS (session start) command over a communication line to another apparatus;

switching means for switching said color image coding means and monochrome image coding means to perform coding in units of pages in one communication cycle depending on whether each page to be transmitted is constituted by a color image or a monochrome image; and declaration means for determining whether to provide each page for transmission coded as a color image or a monochrome image based on a response to the CSS command, the response including information that identifies a coding scheme of the other apparatus, said switching means being responsive to a determination result for each page, and said declaration means notifying the determination result for each page.

2. The apparatus according to claim 1, wherein said switching means switches said coding means by using mode setting values "0" and "1" so that a color image and a monochrome image are switched in accordance with "0" or "1" set for each page.

3. The apparatus according to claim 2, wherein the mode setting values used by said switching means are set in advance by a user soft switch.

4. The apparatus according to claim 1, further comprising storage means for storing coded data obtained by each of said coding means at least until communication of each page data is ended, wherein said switching means selects coded data obtained by an arbitrary coding scheme in units of pages by selectively outputting coded data obtained by one of said coding means and stored in said storage means.

5. The apparatus according to claim 1, further comprising transmission means for transmitting information indicating a coding scheme used for each page, as a protocol, to a receiving end upon switching of the coding scheme for each page.

6. The apparatus according to claim 1, wherein the CSS command includes information that indicates a coding scheme of said transmission apparatus.

7. The apparatus according to claim 6, wherein the CSS command has an NSC (non-standard function command) that includes information indicating the coding scheme of said transmission apparatus.

8. An image transmission apparatus comprising:

color image coding means;

monochrome image coding means;

means for transmitting a CSS command over a communication line to another apparatus;

means for discriminating whether a coding method which an apparatus at another end of a communication line can handle is a monochrome coding method or a color image coding method, based on a response to the CSS command, the response including information that identifies a coding scheme of the other apparatus; and declaration means for determining whether to provide each page of data to be transmitted coded as a color image or a monochrome image based on a discrimination result by said discriminating means, said declaration means notifying the determination for each page.

9. The apparatus according to claim 8, further comprising switching means for arbitrarily switching said coding means suitable for coding in units of pages in one communication cycle so as to perform coding depending on whether each page is constituted by a color image or a monochrome image, if the apparatus at the other end of the line can handle both the coding schemes.

10. The apparatus according to claim 8, further comprising transmission means for transmitting information indicating a coding scheme used for each page, as a protocol, to a receiving end upon switching of the coding scheme for each page.

11. The apparatus according to claim 8, wherein the CSS command includes information that indicates a coding scheme of said transmission apparatus.

12. An image transmission apparatus comprising:

color image coding means;

monochrome image coding means;

means for transmitting a CSS command over a communication line to another apparatus;

storage means for storing pages of coded data obtained by both said color image coding means and said monochrome image coding means;

means for discriminating whether a coding method which an apparatus at another end of a communication line can handle is a coding method or a color image coding method, based on a response to the CSS command, the response including information that identifies a coding scheme of the other apparatus;

declaration means for determining whether to provide each page for transmission coded as a color image or a monochrome image, said declaration means notifying the determination for each page based on a discrimination result by said discriminating means; and transmission means for transmitting the coded data to the apparatus at the other end of the line.

13. The apparatus according to claim 12, wherein said selection means selects suitable data of the coded data in units of pages in one communication cycle depending on whether each page is constituted by a color image or a monochrome image, if the apparatus at the other end of the line can receive both types of coded data.

14. The apparatus according to claim 12, further comprising transmission means for transmitting information indicating a coding scheme used for each page, as a protocol, to a receiving end upon switching of the coded data for each page.

15. The apparatus according to claim 12, wherein the CSS command includes information that indicates a coding scheme of said transmission apparatus.

16. An image transmission apparatus comprising:

color image coding means;

monochrome image coding means;

means for transmitting a CSS (session start) command that includes information indicating a coding scheme of said apparatus;

switching means for switching said color image coding means and monochrome image coding means to perform coding in units of pages in one communication cycle depending on whether each page to be transmitted is constituted by a color image or a monochrome image; and declaration means for determining whether to provide each page for transmission coded as a color image or a monochrome image, said switching means being responsive to a determination result for each page, and said declaration means notifying the determination result for each page.

17. An image transmission apparatus comprising:

color image coding means;

monochrome image coding means;

means for transmitting a CSS command which includes information indicating a coding scheme of said apparatus over a communication line to another apparatus;

means for discriminating whether a coding method which the other apparatus can handle is a monochrome coding method or a color image coding method; and declaration means for determining whether to provide each page of data to be transmitted coded as a color image or a monochrome image based on a discrimination result by said discriminating means, said declaration means notifying the determination for each page.

18. An image transmission apparatus comprising:

color image coding means;

monochrome image coding means;

means for transmitting a CSS command which has an NSC (non-standard function command) including information of a coding scheme of said apparatus over a communication line to another apparatus;

storage means for storing pages of coded data obtained both by said color image coding means and by said monochrome image coding means;

means for discriminating whether a coding method which the other apparatus can handle is a coding method or a color image coding method;

declaration means for determining whether to provide each page for transmission coded as a color image or a monochrome image, said declaration means notifying the determination for each page based on a discrimination result by said discriminating means; and transmission means for transmitting the coded data to the other apparatus.

* * * * *